United States Patent [19]
Hirasawa

[11] Patent Number: 5,504,866
[45] Date of Patent: Apr. 2, 1996

[54] LAN CONTROL SYSTEM

[75] Inventor: Yutaka Hirasawa, Tokyo, Japan

[73] Assignee: Kabushiki Kaisha Toshiba, Kawasaki, Japan

[21] Appl. No.: 337,240

[22] Filed: Nov. 4, 1994

Related U.S. Application Data

[63] Continuation of Ser. No. 836,735, Feb. 19, 1992, abandoned.

[30] Foreign Application Priority Data

Feb. 19, 1991 [JP] Japan .................................. 3-024415

[51] Int. Cl.$^6$ .............................. G06F 13/42; H04Q 5/14
[52] U.S. Cl. ............... 395/200.16; 395/832; 340/825.03; 340/825.52
[58] Field of Search ........................ 340/825.02, 825.03, 340/825.07, 825.21, 825.52; 370/85.1, 85.2, 85.6, 85.7, 94.1, 94.3, 95.1, 95.2, 109; 395/200.1, 200.12, 200.16, 200.2, 823, 829, 832

[56] References Cited

U.S. PATENT DOCUMENTS

| | | | |
|---|---|---|---|
| 4,468,729 | 8/1984 | Schwartz | 364/DIG. 1 |
| 4,490,817 | 12/1984 | Turner | 370/94.1 |
| 4,680,583 | 7/1987 | Grover | 370/95.2 |
| 4,701,908 | 10/1987 | Ikeda | 340/825.52 |
| 4,716,410 | 12/1987 | Nozaki | 340/825.52 |
| 4,760,572 | 7/1988 | Tomikawa | 340/825.52 |
| 4,825,204 | 4/1989 | Nakamura | 340/825.52 |
| 4,835,673 | 5/1989 | Rushby et al. | 364/DIG. 1 |
| 4,887,075 | 12/1989 | Hirasawa | 340/825.03 |
| 4,937,815 | 6/1990 | Lighthart | 370/95.2 |
| 5,014,186 | 5/1991 | Chisholm | 364/DIG. 1 |
| 5,029,209 | 7/1991 | Strong, Jr. et al. | 340/825.52 |
| 5,053,883 | 10/1991 | Johnson | 340/825.52 |

Primary Examiner—Alyssa H. Bowler
Assistant Examiner—Mark H. Rinehart
Attorney, Agent, or Firm—Oblon, Spivak, McClelland, Maier & Neustadt

[57] ABSTRACT

A LAN control system including an information processing device and a plurality of LAN control sections. Each of the control sections stores a self-address, an other party address, and an other party address mask value. The source address in a received data frame is masked with the other party address mask value for comparison. This allows the control section corresponding to the source address to perform the processing of the received data frame.

10 Claims, 3 Drawing Sheets

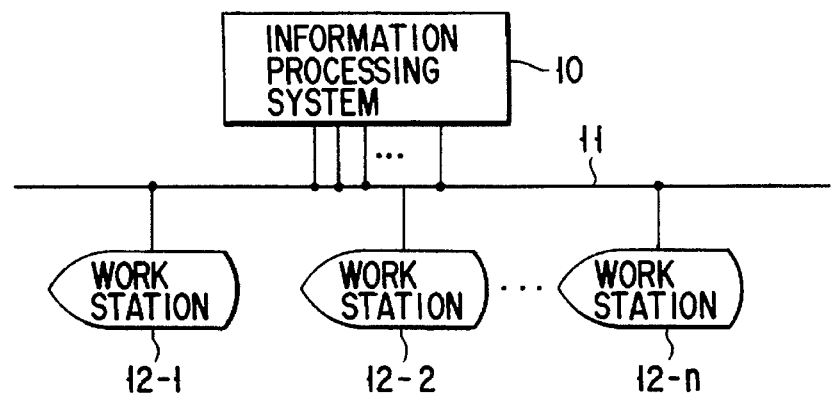
F I G. 1
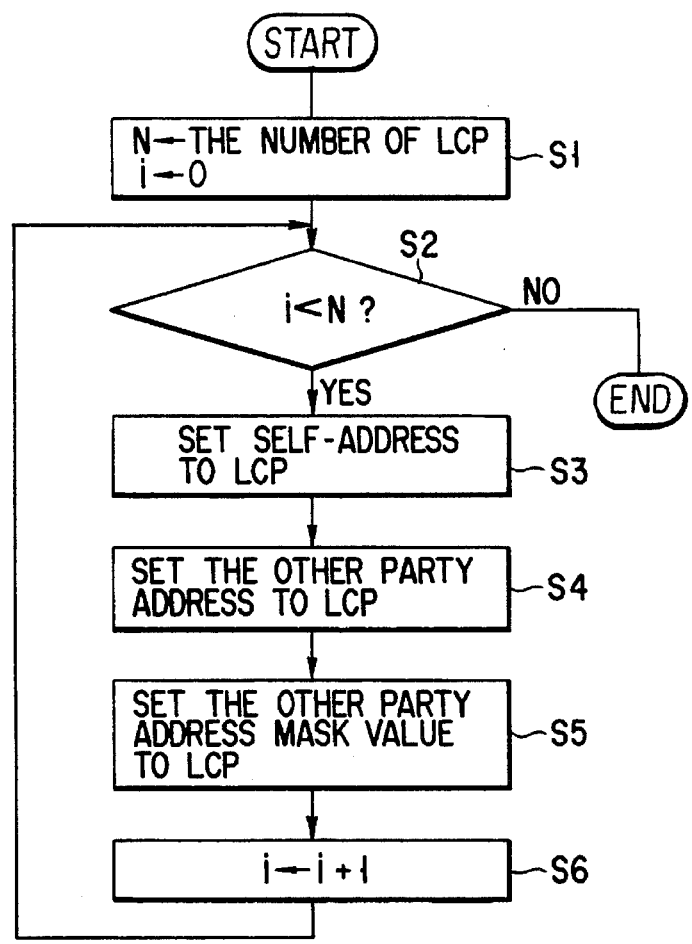
F I G. 3

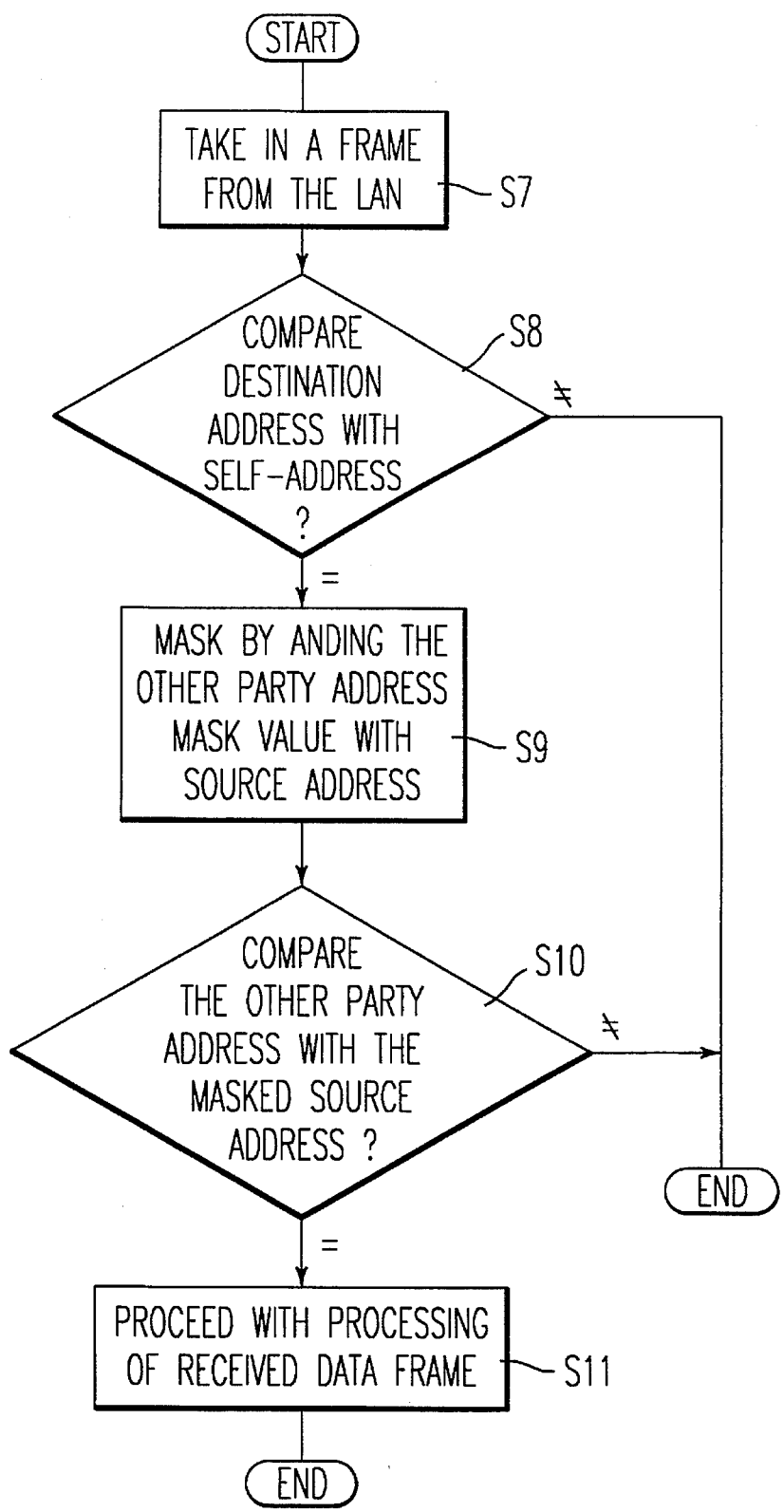

LAN CONTROL SYSTEM

This application is a continuation of application Ser. No. 07/836,735, filed on Feb. 19, 1992, now abandoned.

BACKGROUND OF THE INVENTION

1. Field of the Invention

This invention relates to a control apparatus for connecting a local area network (LAN) to an information processing device and a method of controlling the LAN.

2. Description of the Related Art

For example, a LAN communication system conforming to IEEE 802.3 is constructed as described hereinafter. Each information processing system connected to a LAN is allocated a unique 6-byte address. A calling information processing system transmits a frame to a desired information processing system by specifying the latter unique address. Each address in the LAN is normally stored beforehand in the data base of the information processing unit or a read only memory (ROM). In a network called TCP/IP, a protocol known as ARP (address resolution protocol) is used to obtain an address in the LAN.

To monitor frames flowing over the LAN for the purpose of taking in frames only with the self-address, a LAN control processor (hereinafter, referred to as an LCP) is provided between the LAN and each information processing unit. The LCP is also provided with the function of transmitting frames. In one recent method of decreasing a load on the information processing system, the LCP is caused to realize a low-level protocol in the network by using firmware. With this method, however, the LCP has to deal with an increased amount of processing. This results in a delay in processing by the LCP in a large-scale system, which limits the amount of processing by the information processing unit.

As noted above, in conventional LAN systems, an increase in the amount of processing at the LCP between the LAN and the information processing unit leads to a delay in processing. This imposes limitations on the amount of processing by the information processing unit.

A related literature of the present invention is U.S. Pat. No. 4,887,075.

SUMMARY OF THE INVENTION

The object of the present invention is to provide a LAN control device capable of increasing the amount of processing by an information processing system by providing the information processing system with a plurality of LCPs to distribute loads to these LCPs, as well as a method of controlling the LAN.

A control device for connecting a processing device to a LAN, according to the present invention, includes an information processing device for processing information obtained from said LAN, and a plurality of LAN control devices which transmit and receive frames to and from said LAN according to transmission and reception requests by said information processing device. The control device is characterized in that each of the LAN control devices includes a self-address storing section for storing the self-addressed sent from said information processing device; the other party address storing section for storing and retaining the other party address sent from said information processing section; the other party address mask storing section for storing and retaining the other party address value sent from said information processing section; a masking section for masking the source address in the frame received with said the other party address mask value; and a section for comparing said source address with said the other party address to perform the specified processing of the frame corresponding to said source address.

A method, according to the present invention, of controlling a LAN in a LAN control device that is located between a processing device and the LAN and contains a plurality of control devices, each of which includes a self-address storing section, an other party address storing section, and an other party address mask storing section includes a first step of causing the processing device to initialize all of the control device; and a second step of monitoring frames on the LAN to cause the control device corresponding to the source frame to process this frame. The second step further including the substeps of monitoring frames on the LAN and allowing each of the control device to take in the frame when a frame obtained from the LAN is completed; comparing the destination address in the frame with the self-address stored in the self-address storing section and, based on the comparing result, determining whether to continue the processing or not; masking the source address in the frame with the other party address mask value stored in the other party address mask storing section; and comparing the masking result with the value stored in the other party address storing section and, based on the comparing result, determining the control device corresponding to the frame.

After taking in a frame from the LAN, the control device of the present invention compares the destination address with the self-address to determine whether or not they coincide. When they coincide, the control device compares the value set in the other party address with the value obtained by masking the source address in the frame with the other party address mask value. Here, of those control devices, only one that has the other party address equal to the resulting value proceeds to the next processing. The remaining control devices discard the frames and end the processing. The control device going to the next step performs various frame processes, including other protocol processes and the report of reception frames to the information processing device.

As described above, with the LAN control system of the present invention, the information processing device is provided with a plurality of LCPs to distribute loads to these LCPs. This helps the information processing device increase the amount of processing.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a schematic block diagram showing the construction of a LAN to which a control system according to the present invention is applied;

FIG. 3 is a flowchart for initial setting at an LCP in the information processing system of FIG. 2; and FIG. 4 is a flowchart for frame reception at the LCP of FIG. 2.

DETAILED DESCRIPTION OF THE PREFERRED EMBODIMENT

Figure 2:
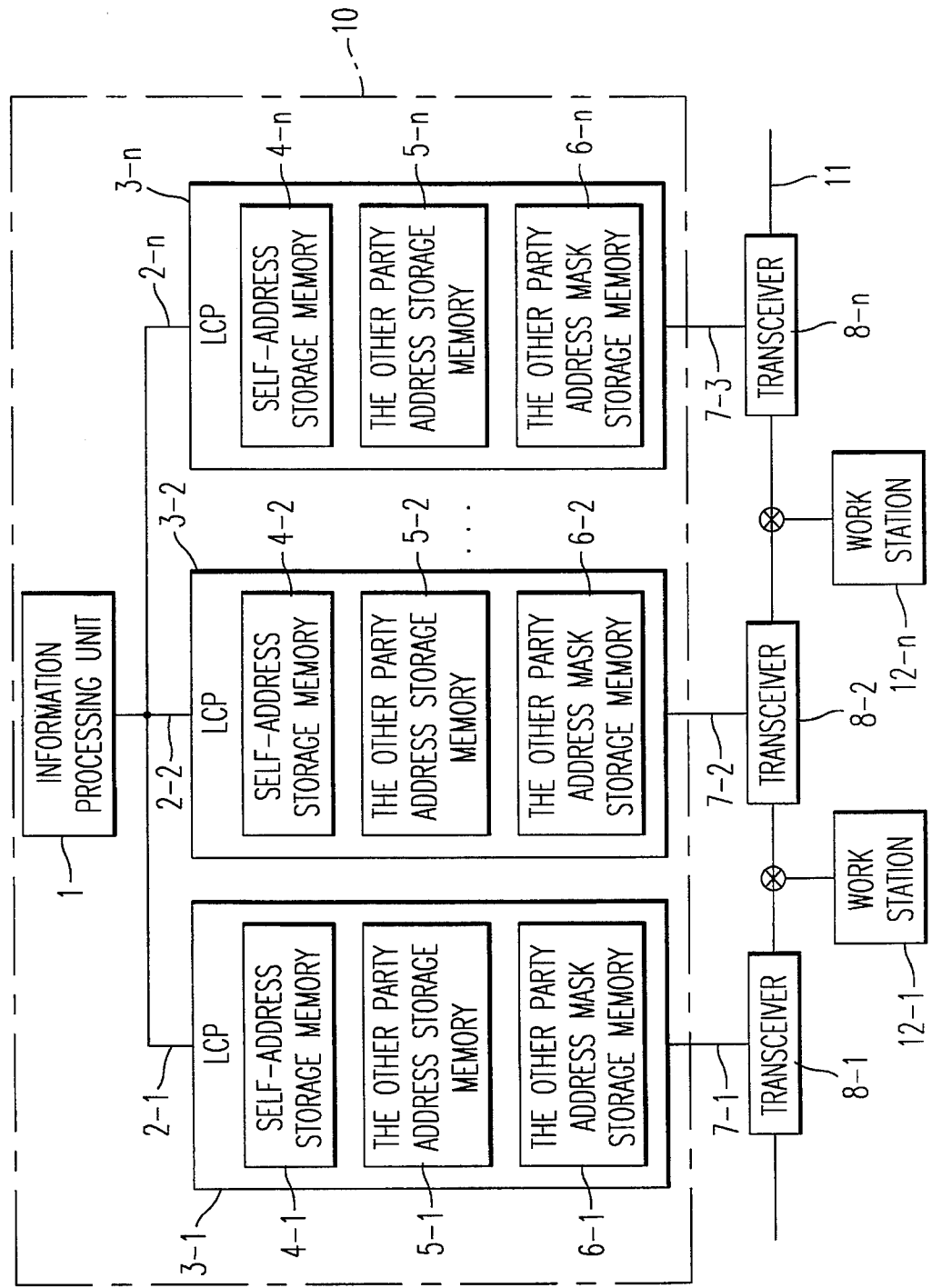
FIG. 2 is a block diagram illustrating the connection of a LAN and an information processing system to which a control system of the present invention is applied.

Referring to the accompanying drawings, an embodiment of the present invention will be explained in detail.

FIG. 1 is a block diagram showing an overall construction of a LAN.

In FIG. 1, a LAN 11 is assumed to comply with IEEE 802.3 (or Ethernet). An information processing system is connected to the LAN 11 and is provided with a plurality of LCPs described later in detail. Workstations 12-1, 12-2, . . . , 12-n (these are referred to as workstations to distinguish them from an information processing system of the present invention) perform data communication with the information processing system 10 via the LAN 11.

FIG. 2 is a detailed block diagram of the information processing system of FIG. 1.

Referring to FIG. 2, the connection of the information processing system 10 and LAN 11 will be explained.

The information processing system 10, which communicates with other systems via the LAN 11, is composed of an information processing unit 1 and a plurality of LCPs 3-1, 3-2, . . . , 3-n. The information processing unit 1 is connected to the LAN 11 via these LCPs 3-1, 3-2, . . . , 3-n, which will be explained later. The information processing unit 1 is connected, via buses 2-1 through 2-n serving as information transfer paths, to the LCPs 3-1 through 3-n, respectively, which are in turn connected, via transceiver cables 7-1 through 7-n, to the LAN 11, respectively. Transceivers 8-1 through 8-n, which are installed on the LAN 11, transmit and receive signals to and from the LAN 11. The transceiver cables 7-1 through 7-n are connected to the LAN 11 via the transceivers 8-1 through 8-n, respectively.

The LCPs 3-1 through 3-n transmit and receive frames to and from the LAN 11 according to a transmission/reception request by the information processing unit 1. They contain their self-address storage memories 4-1 through 4-n, the other party address storage memories 5-1 through 5-n, and the other party address mask storage memories 6-1 through 6-n, respectively. The self-address storage memories 4-1 through 4-n store a self-address set by the information processing unit 1 and all hold the same address value. The other party address storage memories 5-1 through 5-n store and retain the other party addresses set by the information processing unit 1. The other party addresses held in the other party address storage memories 5-1 through 5-n are different from each other. The other party address mask storage memories 6-1 through 6-n store and retain the other party address mask values set by the information processing unit 1. The LCPs 3-1 through 3-n further contain control sections (not shown), respectively, which initialize each memory in each LCP and process the frames taken in from the LAN as explained later.

The operation of the system constructed as described above will be explained, referring to the flowcharts in FIGS. 3 and 4.

FIG. 3 is a flowchart for initializing the LCPs 3-1 through 3-n.

The information processing unit 1 checks the number of LCPs 3-1 through 3-n connected and then sets the number found as the number of loops (step 1). In step S1, N indicates the number of LCPs 3-1 through 3-n connected, and i represents the number of LCPs 3-1 through 3-n initialized. In this step, i is set at 0.

It is judged whether or not the initial setting of all LCPs 3-1 through 3-n has been finished, that is, whether i reaches N or not (step S2). If all LCPs have not been initialized yet, the self-address is notified to the LCPs 3-1 through 3-n (step S3). If the initialization is completed, this process is finished. The information processing unit 1 tells its self-address to the LCPs 3-1 through 3-n, which then store the self-address in the respective self-address storage memories 4-1 through 4-n.

Then, the information processing unit 1 tells the other party addresses to the LCPs 3-1 through 3-n (step S4), which in turn store different other party addresses in the other party address storage memories 5-1 through 5-n, respectively.

The information processing unit 1 tells the other party address mask value to the LCPs 3-1 through 3-n (step 5), which then store the mask value in the other party address mask storage memories 6-1 through 6-n.

The processing of steps S2 through S5 completes the initialization of one LCP. After this, 1 is added to the number i of LCPs to be initialized (step S6). The processing of steps S2 through S6 is repeated until all LCPs are initialized.

The frame reception processing at the LCPs 3-1 through 3-n will be described, referring to the flowchart in FIG. 4.

It is assumed that in the initialization in FIG. 3, the LCPs 3-1 through 3-n are set for the values described below. Here, the system is assumed to have eight LCPs and each of the LCPs 3-1 through 3-8 is assumed to contain eight self-address storage memories 4-1 through 4-8, eight other party address storage memories 5-1 through 5-8, and eight other party address mask storage memories 6-1 through 6-8.

The individual memories hold 6-byte values (hexadecimal) as follows: '026854391222' is stored in each of the self-address storage memories 4-1 through 4-8; '000000000001' in the other party address storage memory 5-1; '000000000002' in the other party address storage memory 5-2; '000000000003' in the other party address storage memory 5-3; '000000000004' in the other party address storage memory 5-4; '000000000005' in the other party address storage memory 5-5; '000000000006' in the other party address storage memory 5-6; '000000000007' in the other party address storage memory 5-7; '000000000000' in the other party address storage memory 5-8; and '000000000007' in each of the other party address mask storage memories 6-1 through 6-8.

The LCPs 3-1 through 3-8 monitor frames on the LAN 11 and, when a particular frame is completed, take it in (step S7). As evident from the example, typically the value of the other party address mask is determined by the number of LCPs minus one. The processing at step S7 is conventional and is performed by the LCPs 3-1 through 3-8. In this embodiment, it is assumed that the workstation 12-1 with the address '026854895325' transmits a frame including the destination address '026854391222' to the information processing system 10.

The LCPs 3-1 through 3-8 compare the destination address '026854391222' in the frame with the self-address to check for coincidence (step S8). If the destination address does not agree with the self-address, the frame will be discarded. In the present embodiment, however, because those two addresses coincide with each other, control proceeds to the next step S9.

The source address '026854895325' of the frame is masked with the mask value '000000000007' set in the other party address mask storage memories 6-1 through 6-8 (step S9). This masking process is carried out by ANDing the source address with the mask value. Thus, the AND of '026854895325' with '000000000007' by bit produces '000000000005'.

The LCPs 3-1 through 3-8 compare the resulting value '000000000005' with the value set in the other party address storage memories 5-1 through 5-8 (step S10). In this case, it is only the other party address storage memory 5-5 in the LCP 3-5 that holds a value equal to '000000000005.' Therefore, only LCP 3-5 proceeds to step S11, while the remaining LCPs discard frames and end the processing.

The LCP 3-5 performs various processings on the received frames, including other protocol procesings and the report of a reception frame to the information processing unit 1 (step S5).

The LAN control device according to the present invention performs reception processings as described above. In general, the workstations 12 are equally allocated addresses, so that loads are distributed evenly to the individual LCPs 3-1 through 3-n in the LAN 11 with many workstations 12.

The present invention may be applied not only to LANs conforming to IEEE 802.3, but also to other types of LANs such as a token pathing bus (complying with IEEE 802.4), a token ring (complying with IEEE 802.5), and the CSMA system. In a network with such a protocol as ARP in TCP/IP, the individual LCPs do not have to hold the same address in the self-address storage memories 4-1 through 4-n.

The embodiments described herein are illustrative and not restrictive. This invention may be practiced or embodied in still other ways without departing from the spirit of the essential character thereof.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In a LAN system in which an information processing device is connected to a LAN, the improvement comprising:

a plurality of LAN control means connected between said information processing device and said LAN, for receiving data frames from said LAN, each of said LAN control means including, self-address storing means for storing a common self-address sent from said information processing device, other party address storing means for storing and retaining an other party address sent from said information processing device for assigning incoming data frames to a particular control means, other party address mask storing means for storing and retaining a common other party address mask value sent from said information processing device, masking means for masking a source address in a received frame with said other party address mask value stored in said other party address mask storing means to produce a masked source address when the stored self-address is the same as a destination address included in the received data frame, and means for comparing said masked source address with said other party address stored in the other party address storing means and performing processing specified in the received data frame when the comparing result indicates that the masked source address and the other party address are the same.

2. A LAN system according to claim 1, wherein said information processing device includes means for initializing each of said LAN control means.

3. A LAN system according to claim 2, wherein said information processing device includes:

first setting means for setting the same self-address in each of said self-address storing means of said LAN control means;

second setting means for setting different other party addresses in each of said other party address storing means of said LAN control means, respectively; and third setting means for setting respective other party address mask values in each of said other party address mask storing means of said LAN control means.

4. A control device according to claim 1, wherein each of said LAN control means includes comparing means for comparing a destination address in the received data frame with the stored self-address.

5. A control device according to claim 1, wherein said masking means includes means for ANDing said source address with said other party address mask value.

6. In a control device for connecting a processing device to a LAN, the improvement comprising:

a plurality of LAN control means each of which includes, storing means for storing a common self-address, an other party address for assigning incoming data frames to a particular control means, and a common other party address mask value, masking means for masking a source address included in a data frame received from said LAN with said other party address mask value stored in said storing means to produce a masked source address when the stored self-address is the same as a destination address included in the received data frame, and means for comparing said masked source address with said other party address stored in said storing means and performing processing specified in the received data frame when the masked source address is the same as the stored other party address.

7. A method of controlling communication between a processing device and a LAN, comprising:

providing a plurality of control means, each of which includes means for storing a common self-address, means for storing an other party address for assigning incoming data frames to a particular control means, and means for storing a common other party address mask value;

causing said processing device to initialize in each said control means a self-address in said means for storing a self-address, an other party address in said means for storing an other party address, and an other party address mask value in said means for storing an other party mask value; and monitoring, in each control means, data frames on the LAN and allowing each of said control means to take in a data frame when a completed data frame is received from the LAN;

comparing, in each control means, a destination address in the completed frame taken in from the LAN with the self-address stored in said self-address storing means and, based on the comparing result, determining, in each control means, whether or not to continue processing of the received data frame taken in based on whether the destination address is the same as the self-address stored in said self-address storing means;

when the destination address is the same as the stored self-address, continuing to process the received data frame by performing the following steps, masking, in each control means, a source address in the completed data frame taken in from the LAN with the other party address mask value stored in said other party address mask storing means to produce a masked source address in each control means, comparing, in each control means, the masked source address with the stored other party address, and determining, based on the result of comparing the masked source address and the stored other party address, which one of said control means is to process the communication from the LAN to the information processing device of the received data frame.

8. A method of controlling a LAN according to claim 7, wherein the step of causing the processing device to initialize includes:

a first substep of causing said processing device to set the self-address in the means for storing the self-address in each said control means;

a second substep of causing said processing device to set the other party address in the means for storing the other party address in each said control means; and a third substep of causing said processing device to set the other party address mask value in the means for storing the other party address mask value in each said control means.

9. In a method of controlling communication of a data frame from a LAN to a processing device by means of a LAN control device interposed between the processing device and the LAN, the improvement comprising:

providing as said LAN control device a plurality of control means, each of said control means including self-address storing means for storing a common self-address, other party address storing means for storing an other party address for assigning incoming data frames to a particular control means, and other party address mask storing means for storing a common other party address mask value;

monitoring, in each control means, data frames on the LAN and allowing each of said control means to take in a data frame when the frame obtained from the LAN is completed;

comparing, in each control means, a destination address in a frame taken in from the LAN with a self-address stored in said self-address storing means and, if the comparing result indicates that the destination address is the same as the stored self-address, continuing the processing of the received data frame by performing the following steps, masking, in each control means, a source address in said data frame taken in from the LAN with an other party address mask value stored in said other party address mask storing means, comparing, in each control means, a masking result obtained in said masking step with the other party address stored in said other party address storing means, and determining, based on the results of comparing the masking result and the stored other party address in the plural control means, one of said control means as corresponding to said data frame so that the control means determined to correspond to said data frame processes the communication of said data frame to said processing device.

10. A control method according to claim 9, wherein said masking step includes the substep of ANDing said source address in the completed frame taken in from the LAN with the stored other party address mask value.

* * * * *